United States Patent [19]

Petterson et al.

[11] 4,303,454

[45] * Dec. 1, 1981

[54] VAPOR STRIPPING PROCESS

[76] Inventors: Robert C. Petterson, 7800 Cohn St., New Orleans, La. 70018; Roger C. Loubier, 1000 Milton St., Gretna, La. 70053

[ * ] Notice: The portion of the term of this patent subsequent to Nov. 4, 1997, has been disclaimed.

[21] Appl. No.: 165,566

[22] Filed: Jul. 3, 1980

Related U.S. Application Data

[63] Continuation-in-part of Ser. No. 870,103, Jan. 17, 1978, Pat. No. 4,231,804, and Ser. No. 1,053, Jan. 4, 1979, Pat. No. 4,231,805.

[51] Int. Cl.$^3$ ................................................. B08B 5/00
[52] U.S. Cl. ........................................ 134/11; 134/31; 134/37; 134/38; 134/40
[58] Field of Search ................... 134/11, 31, 37, 38, 134/22 R, 40

[56] References Cited

U.S. PATENT DOCUMENTS

| | | | |
|---|---|---|---|
| 2,409,402 | 10/1946 | Thompson et al. | 134/31 |
| 2,571,328 | 10/1951 | Baker | 134/31 X |
| 2,689,198 | 9/1954 | Judd | 134/31 X |
| 2,755,208 | 7/1956 | Kearney | 134/11 |
| 2,756,168 | 7/1956 | Ruggles | 134/40 X |
| 2,956,911 | 10/1960 | Jelen | 134/22 R |
| 2,967,121 | 1/1961 | Allen et al. | 134/22 R |
| 3,042,553 | 7/1962 | Kearney et al. | 134/11 |
| 3,348,934 | 10/1967 | Hinson et al. | 134/31 X |
| 3,391,085 | 7/1968 | Crockett | 134/38 X |
| 3,794,524 | 2/1974 | Nogueira et al. | 134/38 X |
| 3,832,235 | 8/1974 | Cooper et al. | 134/11 X |
| 4,029,517 | 6/1977 | Rand | 134/11 |
| 4,056,403 | 11/1977 | Cramer et al. | 134/11 X |
| 4,101,340 | 7/1978 | Rand | 134/11 |
| 4,193,838 | 3/1980 | Kelly et al. | 134/11 X |
| 4,231,804 | 11/1980 | Petterson et al. | 134/11 |

*Primary Examiner*—Marc L. Caroff
*Attorney, Agent, or Firm*—Levonna Herzog

[57] ABSTRACT

Protective and residual organic coatings are stripped from a surface by substantially sealing the surface from the atmosphere to provide a stripping zone, forming a stream of gaseous stripping composition in an evaporation zone, contacting the surface with the stripping composition in the gaseous state at about ambient temperature and recirculating the gaseous mixture from the stripping zone to the evaporating zone and back to the stripping zone to rapidly increase the concentration of gaseous stripping composition in the stripping zone. Optionally the surface may be rinsed by raising the temperature of the gaseous stripping composition slightly above ambient temperature, whereby the gaseous stripping composition condenses on the surface and flushes the surface free of adhering particles. This process is useful for objects which can be placed in a stripping zone and substantially sealed from the atmosphere, especially objects having an irregular surface, and also for interior surfaces which can be substantially sealed from the atmosphere, including extensive surfaces such as those of storage tanks, tank cars and the holds and ballast tanks of ships.

13 Claims, No Drawings

VAPOR STRIPPING PROCESS

CROSS REFERENCES TO RELATED APPLICATIONS

This application is a continuation-in-part of our copending applications, Ser. Nos. 870,103 and 1,503, filed Jan. 17, 1978 and Jan. 4, 1979 respectively; now respectively U.S. Pat. Nos. 4,231,804 and 4,231,805.

BACKGROUND OF THE INVENTION

The present invention relates to a method for stripping organic coatings from coated objects. More particularly, the present invention concerns a method for stripping protective coatings obtained from compositions based on organic resins and/or prepared with organic vehicles, such as paint, shellac, varnish, lacquer and the like, as well as residual coatings, including oils, asphalts, tars and synthetic polymers such as polystyrene. The method of the invention is especially useful for removing such coatings from objects having irregular surfaces and from large surfaces, including vertical and inclined surfaces in the interior of large constructions, such as storage bins and tanks on land and holds and ballast tanks of ships.

Commonly, paint is stripped from paint objects on a small scale by application of an organic or inorganic solvent or mixture thereof, as discussed in Kirk-Othmer's ENCYCLOPEDIA OF CHEMICAL TECHNOLOGY, Vol. 14, pp. 485-493, 2nd Edition, John Wiley and Sons, 1967.

Among solvents which many formulations employ, hydrocarbons, halocarbons, and particularly methylene chloride (dichloromethane) have been found to be particularly effective. Liquid stripping compositions usually contain additives including thickeners, evaporation retarders and detergents.

Organic solvent formulations for stripping paint and other coatings may be of the "scrape off" type or "flush off" type. Generally, the stripping composition is applied to the coated object by one of the foregoing methods and allowed to stand for some time, after which, the coating which has become swollen and/or softened is removed from the surface, by scraping, in the case of "scrape off" formulations or by flushing with water and/or by wiping with a damp rag in the case of "flush off" formulations.

The foregoing methods are expensive, since the organic solvent, except in the case of application by immersion, is not recovered. Moreover, all of the known procedures are generally dangerous and prohibitively expensive where large surfaces are involved. In addition, the waxes used as evaporation retarders in such formulations are difficult to remove completely and any residual wax interferes with the adhesion of subsequent coatings to the surfaces.

Processes have also been described in U.S. Pat. Nos. 2,689,198 to Judd; 3,794,524 to Nogueira et al and 3,832,235 to Cooper et al, wherein paint is stripped from a relatively small object by contact with the vapors from a boiling solvent composition. In these processes the hot vapors condense to liquids on the painted surface.

A method for cleaning tanks has been disclosed in U.S. Pat. No. 3,042,553 to Kearney et al wherein a solvent is heated to the boiling point to produce solvent vapors which are fed to a tank where they condense and wash the tank walls.

Such methods are not applicable for removing organic coatings from extensive surfaces because the cost of heating a sufficient amount of solvent to reflux for an extended period is prohibitive and moreover, expensive solvent-proof equipment is needed to carry out such an operation on a large scale. Furthermore, in some constructions, such as large metal tanks and ships, a temperature differential from one part of the construction to another can be harmful.

Systems wherein a liquid solvent mist is sprayed on a workpiece have also been used to clean surfaces, as disclosed for example in U.S. Pat. Nos. 4,101,340 to Rand and 2,756,168 to Ruggles. Spray washing requires a large amount of energy and therefore is undesirable in view of the expense and the increasing need to conserve energy.

It is the current industrial practice to remove paint and most other protective coatings from large tanks and other large constructions by the slow, unpleasant, expensive and dangerous procedure of abrasive blasting. It is important that a ballast tank of a ship, which usually carries ballast water, be rust-proof. To this end, ballast tanks are coated with a layer of paint. If the paint coating blisters or fails in any way, it is necessary to remove the paint from the interior of the ballast tank and repaint, to avoid the possibility of rust and eventual holes. This is especially important for ships which carry liquified natural gas. A ballast tank of a ship may have a capacity as large as one million gallons or more and often has a complex "honeycomb" configuration which makes it difficult and laborious for a blaster to work through. Removal and disposal of the large amount of blasting grit needed are costly.

To date, even though abrasive-blasting has severe disadvantages, it is practically the only procedure in use for removing paint from large surfaces; hydroblasting and even pounding with hammers are sometimes employed.

There is a tremendous demand for more effective and less labor-intensive methods for cleaning fixed storage tanks as well as tank cars of railroads and trucks, barge and ship holds of petroleum residues such as tar, pitch, asphalt, and oil, vegetable oil residues and residues of synthetic polymers such as polystyrene which result from storage of the monomer, preparatory to a change in type of cargo, structural repairs, or inspection by government agencies. Some of these tanks and holds have a capacity of more than 20,000,000 gallons.

At present they are cleaned mainly with hand-held high pressure streams of water or water-based solutions or emulsions, often followed by scraping with shovels and other hand tools. Caustic soda solutions may be used too. Costs are very high and the cleanliness achieved is often marginal or unacceptable. Residues are usually wasted and their disposal is a problem.

In our parent applications, Ser. Nos. 870,103 and 1,053, now U.S. Pat. Nos. 4,231,804 and 4,231,805, incorporated herein by reference, we have disclosed an economical process for stripping protective and residual coatings by means of a gaseous stripping composition wherein neither the gaseous stripping composition nor the surface being stripped is substantially above ambient temperature. While our process is surprisingly effective for removing almost all of such coatings, in some cases this process is slow for industrial use. Also, we have found that some coatings contain impurities or pigments which are insoluble in any practical stripping composition. For example, many oils and tarry substances, such as No. 6 Oil (Bunker C oil) and various tars and asphalts encountered in commerce contain small amounts of carbonized material and/or inorganic substances, such as rust particles, some of which are left on the surface, sometimes together with a small amount of the initial petroleum coating which is trapped in and around these particles after our process has been carried out. This residue generally amounts to less than 1% of the original coating and is usually unobjectionable; but sometimes, where a change of cargo is to take place, even such a minor amount of residue is undesirable.

SUMMARY OF THE INVENTION

The principal object of the present invention is the provision of a method of stripping an organic protective or residual coating from a coated object by an economical procedure which avoids problems associated with known stripping procedures.

Other important objects of the invention include the provision of a method for stripping such organic coatings from extensive surfaces, i.e. interiors of large constructions, such as storage tanks, ballast tanks and holds of ships and from surfaces of any shape, complexity or inclination, by a procedure which is more economical, safer to workers, less damaging to the environment and uses less energy than present methods and which also avoids additives which interfere with subsequent recoating of the surface.

Still another important object of the invention is the provision of a process whereby protective and residual coatings are stripped rapidly from a surface.

A further important object of the invention is to provide a method for removing such organic coatings and residues substantially completely, so that the resultant surfaces are clean enough for any change of cargo.

Other objects of the invention will be obvious in part and will in part appear hereinafter.

With the above and other objects of the invention in view, our invention involves stripping an organic coating from a coated surface by contacting the surface with a stripping composition in the gas phase capable of destroying the adhesion between the coating and the surface wherein: the surface to be stripped is substantially sealed from the atmosphere in a stripping zone; a gaseous stream of stripping composition normally liquid at ambient temperature is formed in an evaporation zone which is connected to the stripping zone to provide a substantially closed system; the gaseous stream is circulated into the stripping zone and then the gaseous mixture in the stripping zone is recirculated to the evaporation zone and back to the stripping zone, in order to increase the concentration of gaseous stripping composition rapidly in the stripping zone, but wherein the gaseous pressure in the stripping zone is not above about 200 torr gauge pressure.

In a particular embodiment of our process, the temperature of the gaseous mixture being recirculated is increased to about 1° to 15° C. above the temperature of the surface being stripped. Due to the increase in temperature, the concentration of recirculating gaseous stripping composition increases to the saturation concentration of the surface being stripped, whereby stripping composition condenses on the surface being stripped so as to flush the surface and quickly remove any adhering particles. The rinsing procedure is advantageous where a surface which is substantially 100% free of coating is desired.

DESCRIPTION OF THE INVENTION

We have discovered that organic protective and residual coatings may be stripped from surfaces very rapidly by the action of the vapors of a stripping composition. By organic coatings is meant any coating based on an organic resin or organic vehicle, such as paint, shellac, varnish, lacquer and the like, which is applied to a surface such as metal or wood. Our process is useful for removing protective organic coatings applied to a surface for the protection and/or enhancement thereof and also for removing residual coatings. Residual coatings include for example, petroleum products such as crude oil, Bunker C (No. 6) fuel oil, high paraffin crude oil, asphalt, such as air blown asphalts and vacuum tar bottoms, i.e. the high vacuum distillation residue of certain crude petroleums, and synthetic polymeric materials such as polystyrene and mixtures of residual monomers and polymers which form when monomers are stored, and the like, which have to be removed from the surfaces of holds or tanks for a change of cargo or when it is necessary to clean them for repairs, Coast Guard inspection, and the like.

In accordance with our invention, the surface to be treated is substantially sealed from the atmosphere to form a stripping zone. An evaporation zone containing a blower and a pool of stripping composition is connected to the stripping zone by means of an input conduit suitable for the introduction of gaseous stripping composition into the stripping zone and a return conduit for returning the gaseous mixture from the stripping zone into the vacuum side of the blower. The evaporation zone and the stripping zone together form a closed system.

The evaporation zone is supplied with means to heat the liquid stripping composition and may also include means regulating and/or maintaining the liquid stripping composition at a particular temperature.

In operation a stream of gaseous stripping composition is generated by the action of the blower on the liquid in the evaporation zone and is then forced into the stripping zone by way of the imput conduit. The gaseous mixture in the stripping zone is then circulated back to the evaporation zone via the return conduit where the concentration of the stripping composition in the gaseous mixture is increased.

The gaseous mixture containing a higher concentration of gaseous stripping composition is then recirculated to the stripping zone. In this way, the concentration of the gaseous stripping composition is rapidly raised in the stripping zone. We have found that the rate of stripping seems to be directly related to the gaseous stripping composition concentration in the stripping zone and that the time to strip most oils, asphalts and many polymers is greatly reduced by the use of a high concentration of gaseous stripping composition compared to a lower concentration at a given temperature.

A stripping composition is used which is normally liquid at ambient temperature and pressure and has a vapor pressure at ambient temperature, of about 0.2 to 200 torr, more preferably 10–100 torr. Hydrocarbons and chlorocarbons are preferred stripping agents, particularly hydrocarbons and chlorocarbons which have a reflux temperature of at least 40° C. above ambient temperature and more preferably within the range of 80°–200° C.

In our process, high blower speeds and high evaporation rates can be used to quickly raise the vapor concentration of the gaseous stripping composition in the stripping zone. Most structures and the connecting parts of our system are unaffected by a pressure rise of 100–200 torr and in most cases a stripping composition is used which has a vapor pressure such that the maximum pressure of the system is not above 100–200 torr. If a stripping composition having a high vapor pressure is used, it may be necessary to reduce the blower speed and/or to bleed air through a vent to avoid excessive pressure. In the latter case a solvent recovery system may also be necessary.

We have found surprisingly that the temperature of the gaseous stripping composition is not critical and, moreover, that usually stripping is accomplished faster when either, or more preferably both the stripping composition and surface are at a relatively low temperature. It is generally convenient to carry out our process at about ambient temperature, but a gaseous stripping composition below ambient temperature may also be used.

It is a particular advantage of our process that it is unnecessary and in fact undesirable to heat the stripping composition to reflux. In some instances it is preferable to contact the coating with gaseous stripping composition wherein neither the stripping composition nor coated surface is above about ambient temperature and either the surface or stripping composition is cooled below ambient temperature.

We have found that organic coatings are generally stripped much faster by contact with a gaseous stripping composition at ambient temperature than would be expected with reference to the time required a higher temperatures from considerations of the higher concentration of the gaseous stripping composition and expected faster rate of any chemical reaction at higher temperature.

When a painted surface which has been treated in accordance with our vapor stripping process is freed from the gaseous stripping composition, by air drying or other convenient means, it is found that in many cases, the paint coating has either fallen off completely or can be brushed off readily leaving only small specks of paint. In most cases, the surface which has been contacted with gaseous stripping composition is about 75–100% free of visible paint residue. However, even when an objectionable amount of coating remains, the surface can be abrasive-blasted so as to be 100% clean, in a substantially shorter time than that required to obtain a 100% clean surface by abrasive-blasting alone. Alternately, our process can include a flushing or rinsing operation.

In cleaning surfaces of oily or tarry substances normally more than 99% and in some cases 100% removal is achieved.

During the process of our invention, it is believed that the vapor is adsorbed on and/or absorbed into the coating causing the coating to undergo physical and sometimes chemical changes to break loose from the substrate. Many epoxy, alkyd, polyurethane and polyester coatings form dry flakes which can be readily and economically disposed of or even sold, which is a further unexpected advantage of treatment with a stripping composition substantially in the absence of liquid condensate in accordance with our invention.

Means for circulation of the gaseous stripping composition may also be supplied inside the stripping zone such as a gas pump or blower. The efficiency of the present process is increased and the time required to destroy the adhesion of the coating and the surface is decreased when the gaseous stripping composition is thoroughly circulated throughout the stripping zone. Where two or more areas are being stripped, the gaseous stripping composition withdrawn from one stripping zone may be circulated to another stripping zone. In large scale operations, blowers are used, in order to distribute the vapors throughout the structure in a reasonable time.

In the event that a gaseous stripping composition is chosen which contains two or more components which do not form a homogenous solution in the liquid phase, it is preferable to have separate evaporators for each of such compounds.

Some organic coatings contain impurities such as carbon and rust particles or pigments which are insoluble in any practical gaseous stripping composition, and which remain on the walls of a tank or hold being cleaned and often trap other components of the original coating. In cases where the presence of this small amount of residue, which is usually less than 1% of the original coating, is objectionable, the following modification of our process generally quickly removes all or almost all of the residue.

After the bulk of the coating has been removed at the most economical vapor temperature, which may be ambient temperature or below the temperature of the surface being cleaned, the temperature of the recirculating gaseous mixture is raised slightly above the temperature of the surface, i.e. about 1° to 15° C., more preferably 1° to 10° C., and most preferably 1° to 5° C. above the temperature of the surface being cleaned, by increasing the heat applied in the evaporation zone and/or by heating the input conduit. In the stripping zone the concentration of the gaseous stripping composition is rapidly raised to saturation. As a result, liquid stripping composition quickly condenses on the cooler surface and rinses the surface free of offending particles. Although in this embodiment of our process a larger amount of stripping composition is used than when condensing vapors are avoided, only a minimal increase in the overall cost of stripping occurs in most cases, since the resulting solution of stripped coating normally can be returned to the evaporating zone and added to the pool of liquid stripping composition. Concentrated or substantially pure evaporation residues are drawn from a tap in the bottom of the evaporating zone when enough has accumulated.

Depending upon the particular conditions, the time required to remove a coating in accordance with our process may vary from a few minutes, or for a very large area to several hours. A 3,000 gallon steel tank coated with 2.5 kg. of No. 6 oil has been completely cleaned in about twenty minutes by carrying out our process with a gaseous stripping composition at about 28°–29° C. The gaseous stripping composition was maintained at about 2° C. above the temperature of the tank walls during the last seven minutes of the operation.

The particular amount of stripping composition used varies widely, depending upon the nature and thickness of the coating, the particular stripping composition selected, as well as the volume of the stripping zone and the area of the coated surface to be treated, and whether the process includes a rinsing step. Broadly speaking, the ratio of the weight of stripping composition used to that of the coating removed may be from about 0.5:1 to about 4:1; preferably the maximum amount of stripping composition used, i.e. absorbed and condensed with the coating is less than about 3.5:1 and more preferably less than 3.0:1.

Occasionally an extremely thick coating must be removed as when asphalt has been transported in an unheated vessel or styrene has accidentally polymerized. The inherent flexibility of our process is especially useful for such conditions; the best conditions for removing the coating using a minimum amount of stripping composition can be balanced against the importance of the rapidity or "turnaround time" for the operation.

Provided that the area to be stripped can be substantially sealed from the atmosphere, there is no practical upper limit to the size or complexity of coated structures which can be treated with gaseous stripping compositions in accordance with our invention. We have observed no corrosion problems whatsoever with respect to metal surfaces using the preferred stripping compositions as disclosed above.

Our method is very economical, since the cost of the chemicals is currently low and moreover, most of the chemicals can be recovered for reuse. When stripping petroleum products such as oils, asphalts and also some paints, distillation of the resultant solution allows recovery of both the stripping composition and the coating material. The equipment needed is commercially available at reasonable cost and the manpower requirements are low. Energy requirements are also low.

Another important advantage of our stripping procedure is that personnel need not be exposed to the chemical stripping agents or to the coatings, some of which, such as certain petroleum products, are dangerous; the chemicals can be transferred from shipping containers to the stripping system with little or no exposure to the atmosphere and there is no need for the operators to enter the stripping zone until the vapors have been replaced with air.

The following examples further illustrate the present invention, but must not be construed as limiting the invention in any manner whatsoever. In the following examples, as well as in the disclosure as a whole, all proportions of stripping components are by volume unless otherwise indicated; relative proportions of solvents to paint coating are by weight.

EXAMPLES 1-7

In all examples a composite of 45 samples of No. 6 oil of different origins (3.5 g.) was smeared on the upper walls of a tank (a 500 ml. glass resin kettle) over an area of 190 cm². capped with a rubber stopper equipped with a thermometer and input and return tubes (11 mm. inside diameter). A vapor stream was generated by a 1/125 HP squirrel cage blower which blew air over the surface of liquid stripping composition contained in a 500 ml. 3-necked flask which could be heated electrically, and then the resultant gaseous mixture of air and stripping composition was circulated into the tank. The vapor stream was then returned to the vacuum side of the blower to be again forced over the surface of the liquid so that the concentration of stripping composition in the circulating gaseous mixture was rapidly increased. All tubing was 11-12 mm. i.d. glass or rubber, and the tank input tube was wrapped with heating tape and insulation. The tank was partially immersed in a water bath which kept the temperature of the tank walls constant. The system was brought near equilibrium before each run with the tank replaced by a glass tube fitted with a thermometer. The blower was then stopped, the fitting removed, the tank with No. 6 oil on its walls put in its place and the blower restarted. The specific conditions and results of each example are set forth in Table 1.

In Table 1 St. means stripping and St. Cp. means stripping composition. The percent of stripping composition used includes stripping composition which is absorbed and/or condensed during the process.

As shown by the results of Example 1, when the gaseous stripping composition is recirculated at a temperature 10° C. above that of the wall surfaces of the tank being stripped, stripping and rinsing are complete and rapid, and the amount of stripping composition used is acceptable.

In Example 2, the gaseous stripping composition is maintained at a temperature of 6° C. below the surfaces being stripped. In 12 minutes almost all of the oil (about 99%) is removed; however, no condensation takes place. There is no rinse and a thin spotted film of insoluble residue remains on the surface. Only 0.4 g. of toluene was used per gram of No. 6 oil.

In Example 3, the surface is cooled 8° C. below the rather low temperature of the gaseous stripping composition which causes condensation and rinsing to occur. Stripping is slower but at an acceptable rate; however, only a small amount of stripping composition is used to provide a very clean surface.

In Example 4, wherein the temperature of the gaseous stripping composition is raised 8° C. above the temperature of the walls, stripping and rinsing are fast and the amount of solvent used is within acceptable limits.

The temperature of the gaseous stripping composition in Example 5 is increased to 15° C. above the temperature of the walls. The vapor concentration is higher than in Examples 1-4. The stripping and rinsing times are substantially reduced, however, the amount of solvent used, although still acceptable, is relatively high.

Example 6 illustrates a process which is fast, but wherein the amount of stripping composition used is high, although still within acceptable limits. The amount of stripping composition used is due in part to the relatively high volatility of 1,1,1-trichloroethene.

When a less volatile solvent is used as in Example 7, although the stripping and rinsing times are increased, substantially less stripping composition is used.

EXAMPLES 8 and 9

The rusted inside surfaces of a cylindrical steel tank of 11.4 m³. in volume were coated with 2.5 kg. of a No. 6 oil composite. A positive displacement blower driven at about 3,000 rpm forced air and recirculated stripping composition vapors over the surface of liquid stripping composition contained in a 2-necked steel evaporation vessel, heated with an immersion heater, and into the tank through insulated 2.5 cm. i.d. tubing, which was polyethylene except for a one meter length of copper tubing, wrapped with heating tape. The input line extended into the center of the bottom of the tank. A return line of the same size and length connected the top of the tank to the vacuum side of the blower. At the end of the cleaning cycle, the solution of No. 6 oil in stripping composition was removed from the tank, the vacuum side of the blower was opened to the air, and the return line connected to a solvent recovery system. Running the blower for one hour replaced essentially all vapors in the tank with fresh air so that it could be entered for inspection.

The specific conditions of these Examples are set forth in Table 1.

At the conclusion of Example 8, in which no rinsing occurred, streaks of the somewhat oily carbonaceous particles which are present in suspension in the composite sample of No. 6 oil used were observed on the walls of the tank.

At the end of Example 9, in which the vapor space had been saturated with vapors at a temperature 2° C. above the tank wall temperature so that rinsing occurred during the last several minutes of the cleaning process, the walls were 100% free of oil and of dark specks of carbonized oil so that a cloth wiped on the surface picked up only a little brown rust.

All of the foregoing examples illustrate the excellent results of the present process and show that the process can be carried out rapidly, economically, and without heating the stripping composition to reflux, and also that by varying the conditions, substantial reductions in either time and/or use of stripping compositions can be effected.

TABLE 1

| Ex. No. | St. Cp.** | Temp. Liquid St.Cp. °C. | Temp. Gas St.Cp. °C. | Temp. Surface °C. | St. Time (min.) | St. Cp. Used g./g. Removed Coating | Rinse | % Clean Surface |
|---|---|---|---|---|---|---|---|---|
| 1 | A | 46 | 30 | 20 | 4.5 | 2.1 | yes | 100 |
| 2 | A | 20 | 30 | 36 | 12.0 | 0.4 | no | 99+* |
| 3 | A | 25 | 25 | 17 | 20.0 | 0.9 | yes | 100 |
| 4 | B | 40 | 30 | 22 | 7.0 | 2.4 | yes | 100 |
| 5 | B | 56 | 37 | 22 | 3.5 | 3.2 | yes | 100 |
| 6 | C | 39 | 30 | 21 | 5.0 | 3.5 | yes | 100 |
| 7 | D | 67 | 30 | 21 | 18.0 | 1.9 | yes | 100 |
| 8 | B | 53 | 31 | 37 | 43.0 | 2.1 | no | 99+ |
| 9 | B | 85 | 29 | 27 | 20.0 | 3.7 | yes | 100 |

*spots of residue remained
**A = Toluene
B = Tetrachloroethylene
C = 1,1,1-Trichloroethane
D = o-Dichlorobenzene What we desire to claim and protect by letters patent is:

1. In a process of stripping a protective or residual coating from a surface, wherein a gaseous stream of an organic stripping composition normally liquid at ambient temperature and pressure is circulated into contact with the coated surface and wherein neither the coated surface nor the gaseous stream of organic stripping composition is substantially above ambient temperature, the improvement comprising substantially sealing said coated surface from the atmosphere to form a stripping zone, forming a gaseous stream of a stripping composition in an evaporation zone containing a body of liquid stripping composition having a vapor pressure of at least 0.2 torr at ambient temperature and pressure, said evaporation zone being connected directly to said stripping zone so as to provide a substantially closed system, introducing said stream of gaseous stripping composition into said stripping zone into contact with said coated surface and recirculating the gaseous mixture from said stripping zone to said evaporation zone and then back to said stripping zone to rapidly increase the concentration of said stripping composition in said stripping zone but wherein the gaseous pressure in said stripping zone is not increased above about 200 torr.

2. A process according to claim 1 wherein the gaseous stripping composition has a reflux temperature of at least about 40° C. above ambient temperature and the further step of raising the temperature of the gaseous stripping composition being recirculated to about 1° to 15° C. above the temperature of the surface being stripped but below the reflux temperature of said stripping composition, thereby quickly condensing gaseous stripping composition on said surface to rinse said surface so that said surface is substantially completely freed of said coating.

3. A process according to claim 2 in which the temperature of the gaseous stripping composition is raised about 1° to 10° C. above the temperature of the surface being stripped.

4. A process according to claim 2 in which the temperature of the gaseous stripping composition is raised about 1° to 5° C. above the temperature of the surface being stripped.

5. A process according to one of claims 2, 3 or 4 in which the temperature of the gaseous stripping composition is raised toward the end of the stripping process.

6. A process according to one of claims 1, 2, 3 or 4 in which said stripping composition has a vapor pressure of about 0.2 to 200 torr at 20° C.

7. A process according to one of claims 1, 2, 3 or 4 in which said stripping composition has a vapor pressure of 10 to 100 torr at 20° C.

8. A process according to one of claims 1, 2, 3 or 4 in which the stripping composition is a hydrocarbon or halocarbon which has a reflux temperature of about 80° to 200° C.

9. A process according to one of claims 1, 2, 3 or 4 in which the gaseous pressure in the stripping zone is not increased above about 100 torr.

10. A process according to one of claims 1 or 2 wherein stripping and optionally rinsing is carried out without heating the stripping composition to reflux.

11. A process according to claim 1 or 2 in which the coating being stripped is a residual petroleum product.

12. A process according to claim 1 or 2 in which the coating being stripped is paint.

13. A process according to claim 1 or 2 in which the coating being stripped is residual synthetic polymer.

* * * * *